United States Patent
Jugel et al.

(10) Patent No.: US 10,817,890 B2
(45) Date of Patent: Oct. 27, 2020

(54) AUTOMATED VERIFICATION OF MOTIVATIONAL MECHANISM USING SHADOW PERIOD

(71) Applicant: SAP SE, Walldorf (DE)

(72) Inventors: Kay Jugel, Dresden (DE); Axel Schroeder, Berlin (DE); Martin Knechtel, Dresden (DE); Christof Momm, Dresden (DE)

(73) Assignee: SAP SE, Walldorf (DE)

( * ) Notice: Subject to any disclaimer, the term of this patent is extended or adjusted under 35 U.S.C. 154(b) by 118 days.

(21) Appl. No.: 16/191,934

(22) Filed: Nov. 15, 2018

(65) Prior Publication Data

US 2020/0160366 A1  May 21, 2020

(51) Int. Cl.
*G06Q 30/00* (2012.01)
*G06Q 30/02* (2012.01)
*G06N 5/04* (2006.01)
*G06N 20/00* (2019.01)

(52) U.S. Cl.
CPC ......... *G06Q 30/0211* (2013.01); *G06N 5/046* (2013.01); *G06Q 30/0226* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,268,765 B1* | 2/2016 | Rose Charvet | G06F 40/30 |
| 2012/0028230 A1* | 2/2012 | Devereux | G09B 19/00 434/236 |
| 2014/0051506 A1* | 2/2014 | Ameling | G06Q 99/00 463/29 |
| 2015/0328550 A1* | 11/2015 | Herzig | A63F 13/30 463/31 |
| 2017/0301255 A1* | 10/2017 | Lee | G16H 50/20 |

OTHER PUBLICATIONS

STIC EIC 3600 Search Report for application 16191934 dated May 28, 2020 (Year: 2020).*

* cited by examiner

*Primary Examiner* — Matthew T Sittner
(74) *Attorney, Agent, or Firm* — Buckley, Maschoff & Talwalkar LLC

(57) ABSTRACT

A motivational system computer platform may retrieve a current motivational rule set (e.g., a program's motivational mechanism) from a motivational rule set data store. The system may then arrange to execute the program such that inputs from a remote user device are applied to the current motivational rule set resulting in current motivational feedback that is stored into a current motivational feedback data store and transmitted to the user device. The motivational system computer platform may also retrieve a shadow motivational rule set from the motivational rule set data store. The system may then arrange to execute the program such that inputs from the user device are also applied to the shadow motivational rule set, in parallel with the current motivational rule set, resulting in shadow motivational feedback that is stored into a shadow motivational feedback data store without being transmitted to the user device.

9 Claims, 15 Drawing Sheets

| SHADOW RULE SET ID 1402 | ASSOCIATED CURRENT RULE SET ID 1404 | DESCRIPTION 1406 | DATE (TIME) 1408 | ... | STATUS 1410 |
|---|---|---|---|---|---|
| SRS_101 | CRS_101 | TOTAL | 10/10/2020 (04:05) | ... | HIDDEN |
| SRS_102 | CRS_102 | PARTIAL | 10/10/2020 (15:31) | ... | PARTIALLY TRANSITIONED |

AUTOMATED VERIFICATION OF MOTIVATIONAL MECHANISM USING SHADOW PERIOD

FIELD

Some embodiments are associated with motivation mechanisms, such as those used in connection with gamification and/or loyalty programs. In particular, some embodiments provide for an automated verification of a motivational mechanism using a shadow period.

BACKGROUND

An enterprise might use a motivational mechanism to encourage certain behaviors by employees or customers. For example, an employer might use gamification to encourage employees to perform particular tasks more efficiently, consume training materials, prioritize work in a specific way, etc. Similarly, a business might want to encourage customers to visit a retail web page frequently, increase purchases, etc. Loyalty and reward-based bonus programs (e.g., bonus miles given by airlines, incentive programs for customers, commissions for sales, and vendor loyalty points) or gamification concepts in social media may tailored these motivational mechanisms to drive user behavior in certain directions. These programs are typically rule-based systems that look for certain user activities to trigger explicit and measurable consequences (e.g., feedback).

Success in such programs can be measured by comparing the difference between the expected and achieved impact on user behavior. Analytics on user behavior might include, for example, the number of users who receive a certain badge, a number of points, levels, completed missions, etc. along with how much time each user needed to achieve the goal. This type of data might help the enterprise determine if parts of the game are too difficult (or too easy) to master because they take too much (or too little) time to complete, etc.

When this type of a program is newly installed, extended (or expanded), or adapted to encourage new user behavior, it can be difficult to evaluate or verify the real-world impact or effectiveness that is being achieved. For example, it may be hard to measure the success of such programs when historical data is missing. Similarly, it can be unclear to figure out if users or customers are finding ways to exploit a program through loopholes and/or to validate the program's motivational mechanisms (e.g., is the rule-based logic working as intended?).

Currently, an enterprise may manually tune gamification concepts, activate them, and step-by-step re-tune them in order to improve results (and improve user behavior adaptation). This approach can be a tedious and time-consuming process. Moreover, the technique may actually demotivate and annoy users with frequent and confusing changes to the gamification concept and rules.

It may therefore be desirable to provide systems and methods to facilitate an automated verification of a motivation mechanism in an accurate and efficient manner.

SUMMARY OF THE INVENTION

According to some embodiments, systems, methods, apparatus, computer program code and means are provided to facilitate an automated verification of a motivation mechanism in an accurate and efficient manner. A motivational system computer platform may retrieve a current motivational rule set (e.g., a program's motivational mechanism) from a motivational rule set data store. The system may then arrange to execute the program such that inputs from a remote user device are applied to the current motivational rule set resulting in current motivational feedback that is stored into a current motivational feedback data store and transmitted to the user device. According to some embodiments, a "shadow" motivational rule set might be employed to collect information about user behavior without changing the user experience. The motivational system computer platform may then retrieve the shadow motivational rule set from the motivational rule set data store. The program may be executed such that inputs from the user device are also applied to the shadow motivational rule set, in parallel with the current motivational rule set, resulting in shadow motivational feedback that is stored into a shadow motivational feedback data store without being transmitted to the user device.

Some embodiments comprise: means for retrieving, by a motivational system computer platform from a motivational rule set data store, a current motivational rule set; means for arranging to execute a program such that inputs from a remote user device are applied to the current motivational rule set resulting in current motivational feedback that is stored into a current motivational feedback data store and transmitted to the user device; means for retrieving, by the motivational system computer platform from the motivational rule set data store, a shadow motivational rule set; and means for arranging to execute the program such that inputs from the user device are also applied to the shadow motivational rule set, in parallel with the current motivational rule set, resulting in shadow motivational feedback that is stored into a shadow motivational feedback data store without being transmitted to the user device.

In some embodiments, a communication device associated with a gamification engine exchanges information with remote user devices (e.g., a user who is executing a gamified application or program). The information may be exchanged, for example, via public and/or proprietary communication networks.

Technical effects of some embodiments of the invention are improved and computerized ways to facilitate an automated verification of a motivation mechanism in an accurate and efficient manner. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 14 is a portion of a shadow feedback database according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Business software environments include business computer systems, each of which may include multiple, interconnected, computer systems executing computer software applications that perform business operations. A business computer system can be dedicated to a particular aspect of a business, for example, sales, production, marketing, and the like. A business computer system that is dedicated to an aspect can be connected to similar business computer systems that are dedicated to respective other aspects of the business. Such software systems can collectively form a business software environment. A user associated with a particular business computer system (e.g., a sales employee using a sales computer system) can access features associated with the particular business computer system that other users not associated with the particular business computer system cannot access. In addition, the user can access features associated with the business software environment that are accessible to all users of all business computer systems that form the environment.

To enhance productivity and efficiency of employees, and to introduce an element of fun at work, a business can employ gamification techniques, for example, by using game design and mechanics to solve problems and engage its employees. For example, gamification techniques can be implemented as incentives to employees of an aspect of a business, for example, to engage in pseudo-competitions. Such techniques can also be implemented to incentivize employees of one aspect of a business, for example, sales, to engage in pseudo-competitions with another aspect of the business, for example, production. In another example, the sales department can be incentivized to engage in a pseudo-competition of achieving a certain target, for example, a sales goal.

Figure 1:
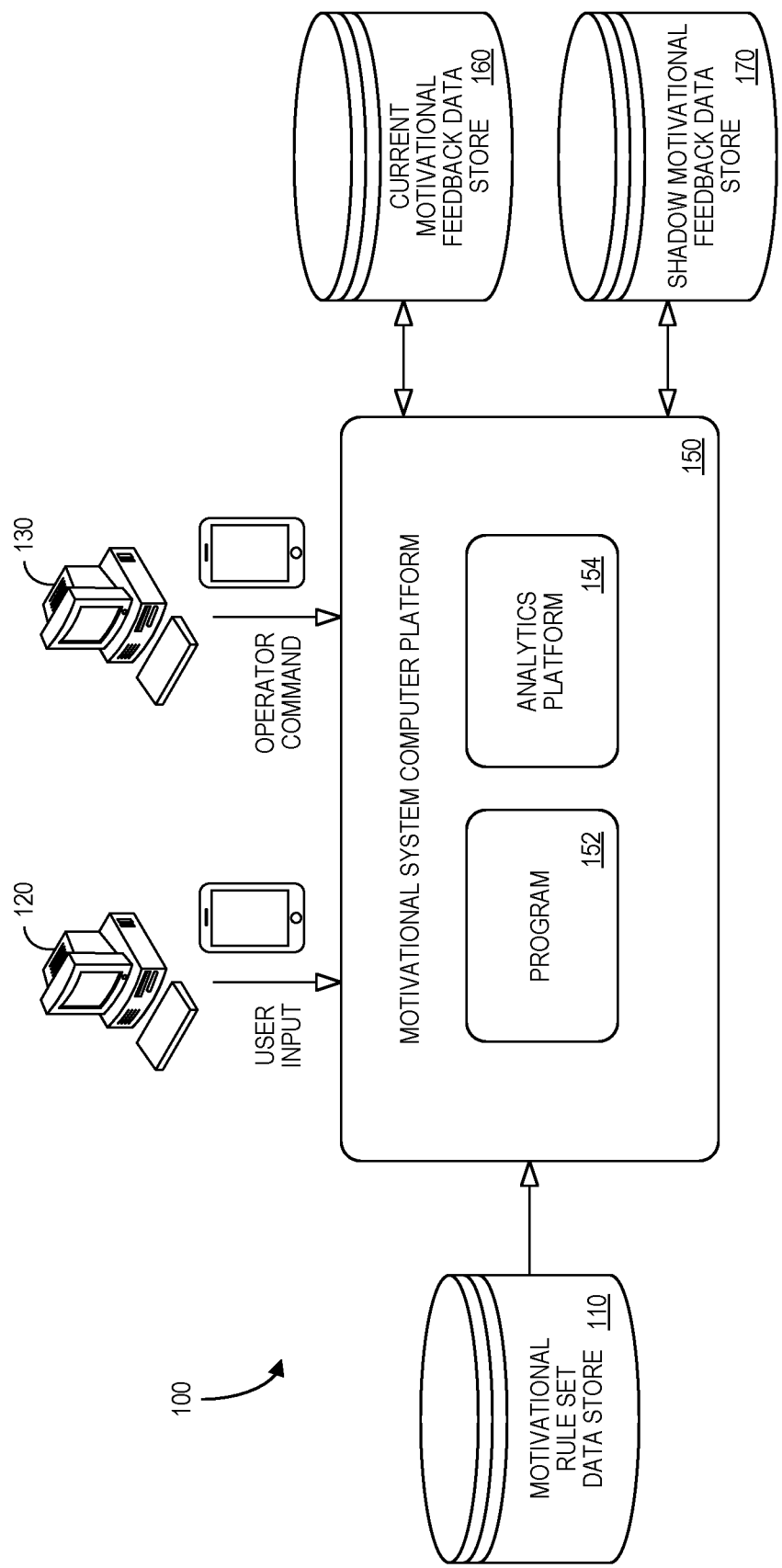
FIG. 1 is a block diagram of a system according to some embodiments.

In some situations, the gamification techniques can be incorporated into or included as part of the business software environment and implemented using one or more gamification computer systems. In a similar way, a customer loyalty program may use one or more enterprise computer systems to encourage particular types of customer behaviors. FIG. 1 is a block diagram of a system 100 according to some embodiments. In particular, the system 100 includes a motivational system computer platform 150 that can access rules from a motivational rule set data store 110. For example, the motivational system computer platform 150 might use a rule set in connection with a program 152 or gamified application to respond to user inputs from remote user devices 120. The motivational system computer platform 150 may respond to the user inputs (based on the rule set), provide feedback to the user, and store the feedback for later analysis by an analytics platform 154 (e.g., to determine if the rule set is operating as intended). The motivational system computer platform 150 might be, for example, associated with a Personal Computers ("PC"), laptop computer, an enterprise server, a server farm, and/or a database or similar storage devices.

According to some embodiments, the motivational rule set data store 110 contains both a current (e.g., "live" or "active") motivational rule set and a "shadow" motivational rule set. The program 152 may execute both rule sets simultaneously and store results in a current motivational feedback data store 160 and a shadow motivational feedback data store 170 as appropriate. As used herein, the "shadow" rule set may be executed but the results of that execution are not transmitted to the remote user devices 120. In this way, the analytics platform 154 can measure the impact of a rule set change without altering the user experience. At some point (assuming the shadow rule set seems to be working as intended), an operator command from a remote operator device 130 might instruct the motivational system computer platform 150 to transition the "shadow" version of the rule set to now become the "active" or "current" version (at which point, users will begin to see the operation of the gamification program 152 or loyalty program change).

As used herein, devices, including those associated with the motivational system computer platform 150 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" motivational system computer platform 150 may support the shadow version of the motivational rule set. As used herein, the term "automated" may refer to, for example, actions that can be performed with little or no human intervention.

The motivational system computer platform 150 may store information into and/or retrieve information from the motivational rule set data store 110, the current motivational feedback data store 160, and the shadow motivational feedback data store 170. The data stores may be locally stored relational database or reside physically remote from the motivational system computer platform 150. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical operator interface may provide an ability to access and/or modify elements of the system 100. The operator interface might, for example, let an operator or administrator analyze rule set performance, manage rule set transitions, etc.

Although a single motivational system computer platform 150 is shown in FIG. 1, any number of such devices may be included. Moreover, various devices described herein might be combined according to embodiments of the present invention. For example, in some embodiments, the motivational system computer platform 150 and motivational rule set data store 110 might be co-located and/or may comprise a single apparatus. Moreover, the functions described herein might be implemented in a cloud-based environment and/or by a service provider (e.g., performing services for one or more enterprises, departments, or businesses).

Figure 2:
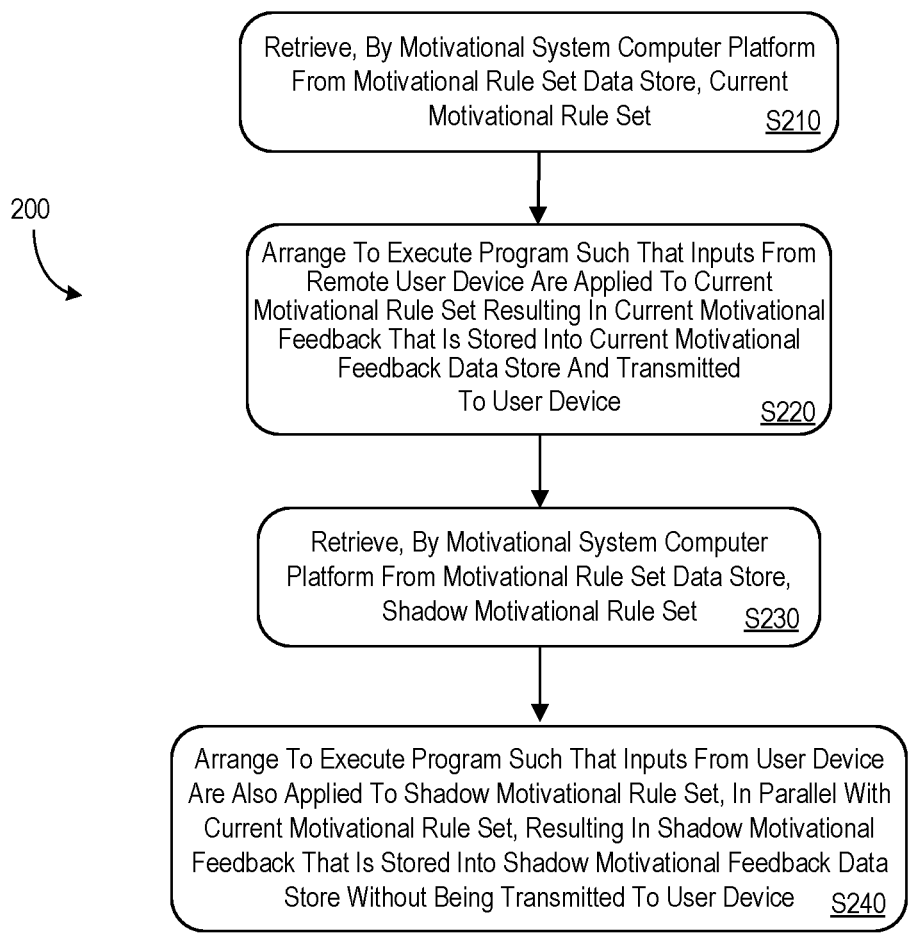
FIG. 2 illustrates method in accordance with some embodiments.

FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a motivational system computer platform may retrieve, from a motivational rule set data store, a current motivational rule set. The rule set might define, for example, the way in which a program might operate (e.g., whether there is a leader board or trophy system, how many points a particular task is worth, etc.). According to some embodiments, the motivational mechanism is associated with at least one of a gamification application and a loyalty program.

At S220, the system may arrange to execute a program such that inputs from a remote user device are applied to the current motivational rule set. This may result in current motivational feedback that is stored into a current motivational feedback data store and transmitted to the user device. The feedback might comprise, for example, badge, a game score, a coupon, etc.

At S230, the motivational system computer platform may retrieve, from the motivational rule set data store, a shadow motivational rule set. The shadow version might comprise, for example, the current version of the rule set with one or more modifications that an operator is interested in "testing out" without altering the user experience.

At S240, the system may arrange to execute the program such that inputs from the user device are also applied to the shadow motivational rule set, in parallel with the current motivational rule set. This may result in shadow motivational feedback that is stored into a shadow motivational feedback data store without being transmitted to the user device. In this way, the operator can compare the two versions (e.g., using an analytics platform to inspect information in the current and shadow motivational feedback data stores) without changing the user experience.

Figure 3:
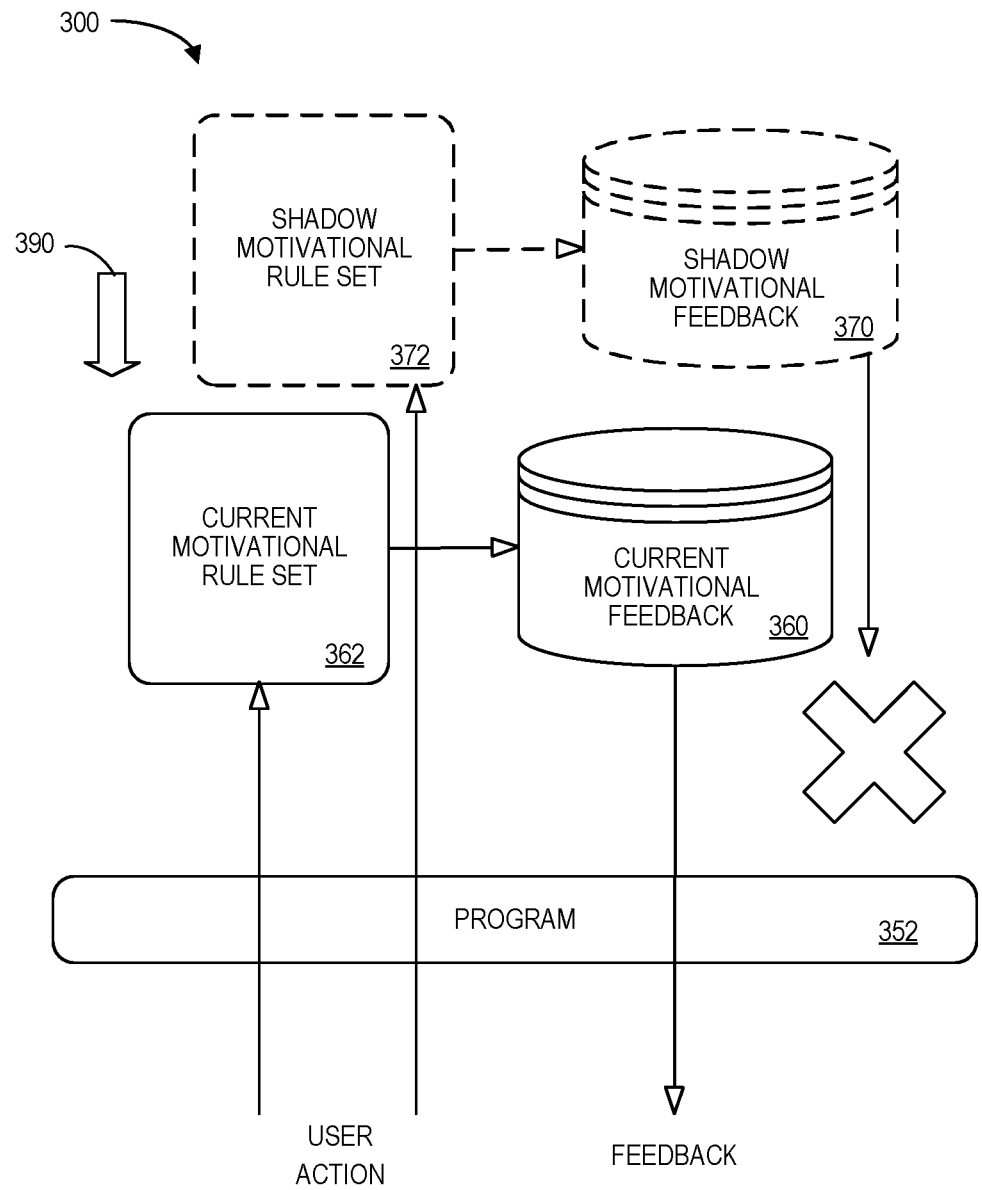
FIG. 3 is an information flow diagram showing the collection of current and shadow motivational feedback according to some embodiments.

FIG. 3 is an information flow diagram 300 showing the collection of current and shadow motivational feedback according to some embodiments. Initially, a user action is received via a program 352 at both a current motivational rule set 362 and a shadow motivational rule set 372 (illustrated with dashed lines in FIG. 3). The results of the current motivational rule set 362 are stored into a current motivational feedback data store 360 and provided back to the user via the program 352. The results of the shadow motivational rule set 372 are stored into a shadow motivational feedback data store 370 without being provided back to the user (illustrated by the "X" in FIG. 3). Thus, the shadow version runs in the background (e.g., secret from the user) and merely collects information without altering the user experience.

Figure 4:
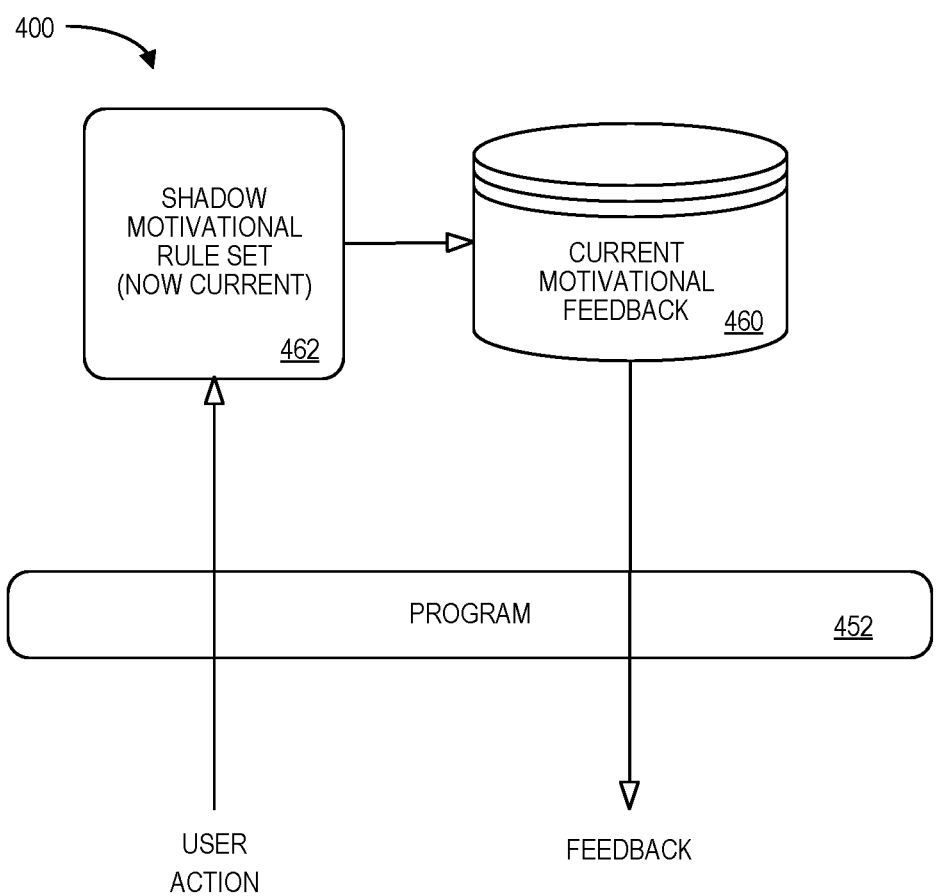
FIG. 4 illustrates a shadow version transitioning to the current version in accordance with some embodiments.
Figure 5:
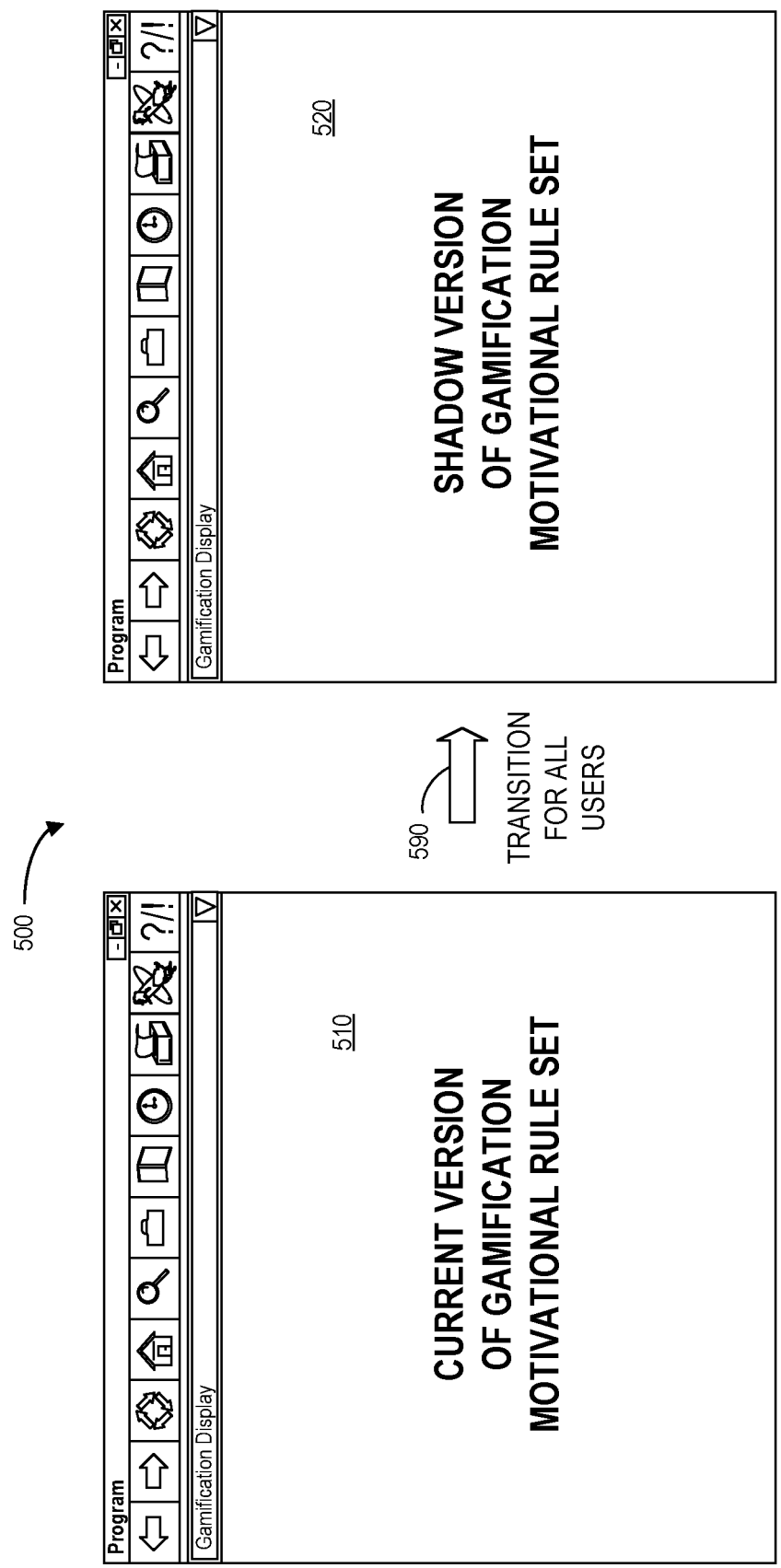
FIG. 5 includes displays that show a shadow version transitioning to the current version in accordance with some embodiments.

According to some embodiments, a motivational system computer platform is further to transition 390 the shadow motivational rule set into the current motivational rule set. The transition 390 might be based on, for example, an input from a remote operator device. According to other embodiments, the transition 390 might be automatically triggered upon a determination that a pre-determined threshold has been reached in connection with the current motivational rule set (e.g., one thousand hours of user game play data has been collected) or a determination that a pre-determined threshold has been reached in connection with the shadow motivational rule set (e.g., one hundred users would have earned a particular trophy). FIG. 4 illustrates 400 a shadow version transitioning to the current version in accordance with some embodiments. A user action received via a program 452 with now be handled by the shadow motivational rule set (which is now the current motivational rule set 462, replacing the old version 362 of FIG. 3). Moreover, results are stored in the current motivational feedback data store 450 and provided back the user (e.g., who now sees that he or she is playing by the "new rules" of the game). FIG. 5 includes displays 500 that show a shadow version transitioning to the current version in accordance with some embodiments. In particular, a current version 510 is seen by all users until a transition is initiated. After the transition, all users will see the shadow version 520 (which is now the current version).

Thus, embodiments may provide a chance to test different rule sets to measure the impact of gamification/loyalty initiatives. By using a shadow period, during which new gamification/loyalty mechanisms are installed but hidden from users may allow comparison between user behavior before and after installation (or changing a loyalty program or gamification concept). It may not be possible to make any meaningful predictions on the effects that a new mechanic will have on users without determining a "normal" user behavior as a base line. The shadow version may execute in the background, while users are working as usual without realizing it exists. During this "shadow period," the system may record all achievements or rewards the user would have gotten (if the system was active or prior to a previous gamification concept becoming active). Embodiments might provide benefits, such as:

- insights about current user activities may allow for modifications and improvements even before being shown to users;
- data collected during a shadow period may allow for a comparison between normal user behavior and the adapted behavior of a user (presumably driven by the introduced gamification concept);
- a comparison may be made between several possible systems (installed subsequently or even in parallel).

Figure 6:
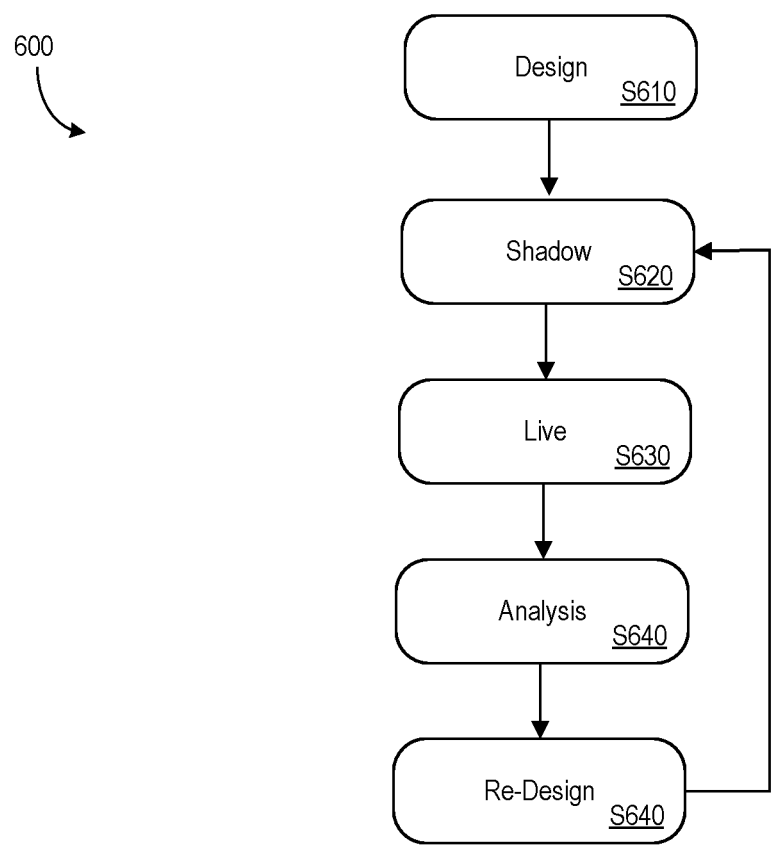
FIG. 6 is a process workflow according to some embodiments.

By way of example, consider an introduction of a new gamification concept for help desk employees. The purpose of the gamification concept might be for employees to process more tickets per day, ensure that critical tickets are processed first, etc. During a shadow period rewards may be measured based on normal behavior (without the users knowing about gamification). This represents a base line for measuring success during a current or live phase. Additionally, the new gamification concept can already be validated and tuned during this phase (e.g., an operator might realize that some rewards cannot be achieved). Note that the such a shadow period may be a core piece of an overall design process that attempts to constantly improve a gamification or reward concept. For example, FIG. 6 is a process workflow 600 according to some embodiments. The process might begin with an initial design S610 phase. Before introducing a gamification or loyalty concept (e.g., a gamification extension for an existing application) the overall gam concept needs to be designed (e.g., with achievements and rewards based on desired user activities).

A shadow S620 phase may be provided for tuning and verification of the design. During the shadow S620 phase, users still work with the old gamification/loyalty concept (or none at all in the case of an initial introduction of gamification). The new version is shadowed in the background, receiving the same input and letting designers verify the obtained output. When designing such changes, a designer might not be aware how often users perform certain activities. By measuring these and evaluating program consequences, it is possible to evaluate the effect of the introduced changes. During this shadow S620 phase, the design can still be adapted even though the users are not actively (or knowingly) interacting with the shadow rule.

During a live phase S630, an operator may activate the new gamification/loyalty concept so that users will now see the rewards (e.g., the feedback). This will cause users to change their behavior, ideally towards what the game designers hoped. During an analysis S640 phase, the system may evaluate user behavior that occurred during the live S630 phase. That is, an analytics platform might compare the expected or desired behavior with the actual user behavior. This can be achieved by comparing the historical data collected during the shadow S620 phase with the live data collected during the live S630 phase.

During a re-design S650 phase, the designers may adapt and improve the original design to further increase user impact as well as counter any loopholes or exploits that may have been discovered. The re-design S650 phase may be based on the results of the analysis S640 phase. The shadow S620, live S630, analysis S640, and re-design S650 phases may be repeated several times to constantly tune and adapt a rule set for users. They may run in parallel (that is, while a new system is already in shadow phase, the old and new systems may be analyzed again to come up with new improvements). As a result, the entire process might comprise a feedback loop that constantly improves the game or loyalty system.

Implementing such a feedback loop may involve various computing components. Together, these components may handle the entire process from the initial design S610 phase through the analysis S640 and re-design S650 phases.

Figure 7:
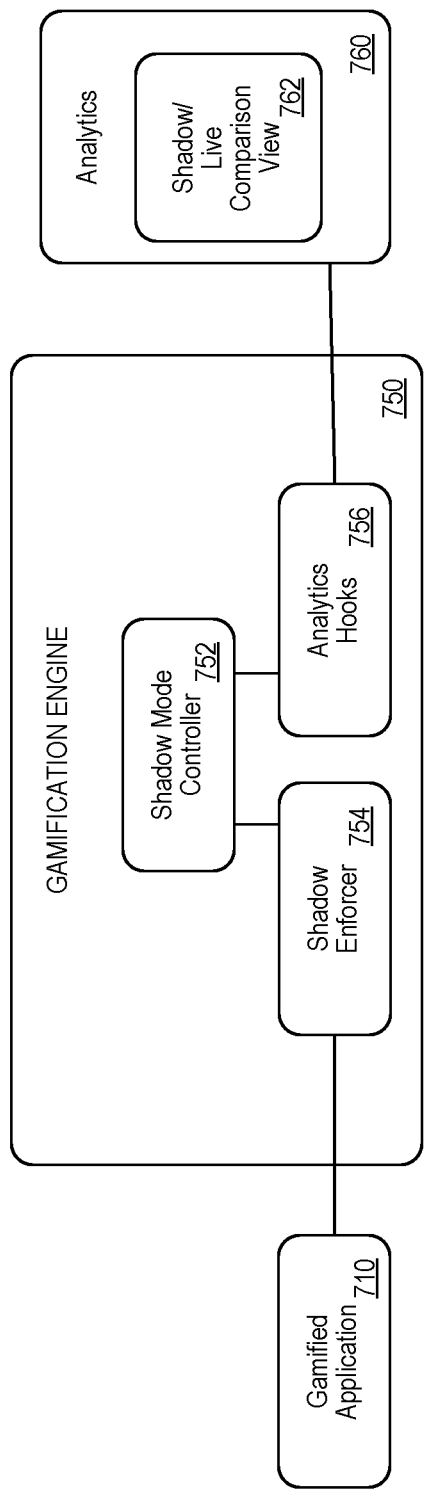
FIG. 7 is a component overview in accordance with some embodiments.

FIG. 7 is a component overview 700 in accordance with some embodiments. Note that a game mechanics designer might utilize any number of tools for creating game designs (including game concepts and rules) that react to user actions. Such a tool may produce a gamified application 710. The gamification mechanics may be structured as versioned sets, which can be deployed separately. In this way, it may be possible to distinguish between shadow and live rule sets. An analytics component 760 may gather and aggregate all gamification events and allow them to be analyzed (e.g., with visualizations such as charts or tables). The gamification events may be provided by analytics hooks 756 in a gamification engine 750 that are dynamically configured based on the selected gamification/loyalty concept and shadow mode configuration. Within the analytics component 760, there may be pre-defined views/reports to compare the shadow data and the live data (e.g., a shadow/live comparison view 762).

A shadow enforcer 754 in the gamification engine 750 may handle filtering and/or blocking data from users. In this way, the users may see the actual live data and not the data generated by the shadow mode. Depending on the current mode, the shadow enforcer 754 might filter all of the shadowed data, some of the shadowed data, or none of the shadowed data. To perform this filtering, the shadow enforcer 754 may evaluate additional meta-data for gamification mechanics sets.

A shadow mode controller 752 component may let game designers toggle between different modes:
  A "shadow mode" may trigger all parts of the gamification mechanics set (e.g., rules) but will not publish any of this information to the user.
  A "live mode" may be the same as the "shadow mode" but will let users see rewards and achievements.
  A "staged shadow mode" may let users see the current live version, but in the background a new system (e.g., the next stage) also triggers additional actions that are still hidden from the user.

According to some embodiments, the shadow mode controller 752 may be associated with a number of different shadow rule sets so that different groups of users may be secretly tested in parallel to try different concepts at the same time. Moreover, the mode might be configured per user and/or per application. In this way, different groups might use the live rule set while others eventually work with an active shadow rule set (or no rule set at all). This approach might be useful, for example with reference groups (e.g., certain limited user groups that test features). Note that different concepts might be tested at the same time (that is, the system does not have to finish testing one concept before it begins testing another concept).

Depending on the configuration, the shadow mode controller 752 component may configure the shadow enforcer 754 to block profile requests for the shadow mode. The shadow mode controller 752 may also configure the analytics hooks 756 to collect and tag the shadow mode and/or live data.

Figure 8:
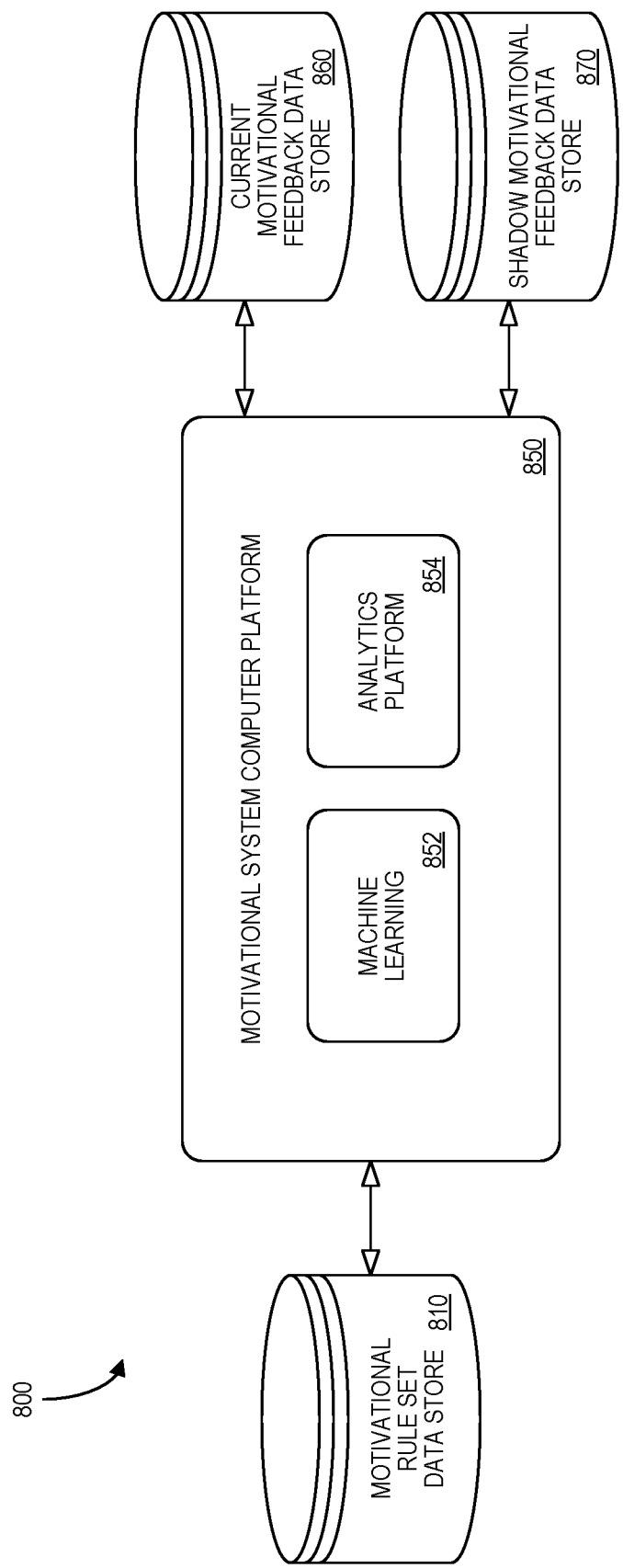
FIG. 8 is a block diagram of a system that incorporates machine learning according to some embodiments.

According to some embodiments, results of comparisons between current and shadow rule set feedback may be used along with machine learning and/or artificial intelligence to automatically generate or modify a motivational rule set. For example, FIG. 8 is a block diagram of a system 800 that incorporates machine learning according to some embodiments. Note that typical approaches might expect human designers to improve the design iteratively within a feedback loop. However, with machine learning this process may be automated so that the system will constantly improve itself by doing slight modifications in very small iterations and/or over longer periods of time, that users might not even notice, but which can still improve game or loyalty program efficiency. As before, the system 800 includes a motivational system computer platform 850 that can access rules from a motivational rule set data store 810. The motivational system computer platform 850 may respond to the user inputs (based on current and shadow rule sets), provide feedback to a user, and store the feedback for later analysis by an analytics platform 854 (e.g., to determine if the new rule set is operating as intended).

According to some embodiments, the motivational rule set data store 810 contains both a current and a shadow motivational rule set. The platform stores results in a current motivational feedback data store 860 and a shadow motivational feedback data store 870 as appropriate. As used herein, the shadow rule set may be executed but the results of that execution are not transmitted to the remote user devices. In this way, the analytics platform 854 can measure the impact of a rule set change without altering the user experience. According to this embodiment, a machine learning 852 component might automatically make decisions about a shadow rule set and/or propose its own changes to a rule set. The machine learning 852 component might be associated with, for example, decision tree learning, association rule learning, artificial neural networks, deep learning, inductive logic programming, support vector machines, clustering, Bayesian networks, representation learning, similarity and metric learning, sparse dictionary learning, genetic algorithms, etc. the machine learning 852 component might also automatically evaluate whether or not particular user behaviors are changing in a beneficial way (and perform some or all of the phases described in connection with the process 600 of FIG. 6).

Figure 9:
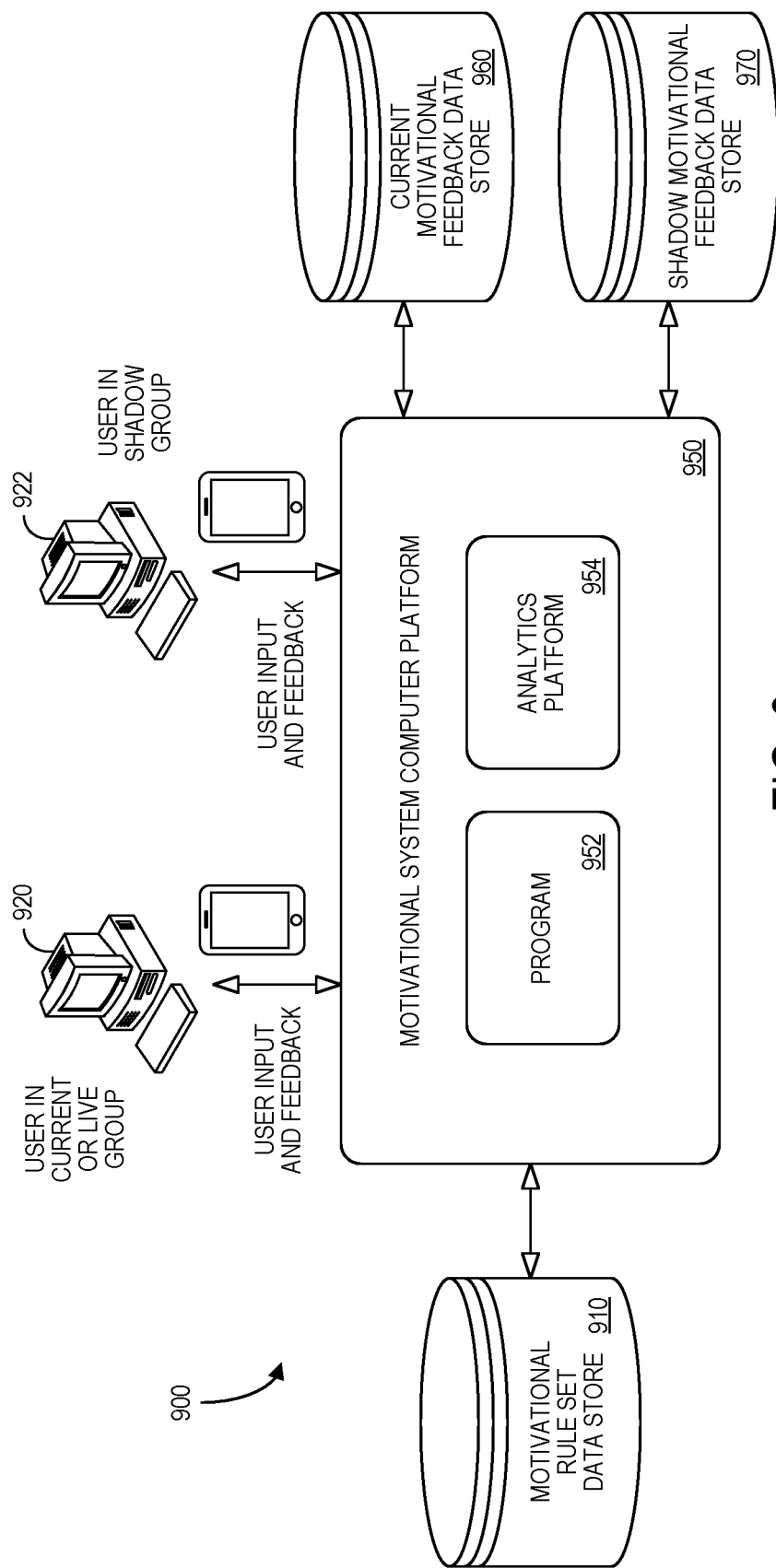
FIG. 9 is a block diagram of a system implementing a partial shadow period in accordance with some embodiments.

According to some embodiments, a transition from "shadow" to "active" (or from "shadow 1" to "shadow 2") is performed for one set of users and not performed for another set of users. Note that such an approach might be useful in connection with a Machine Learning ("ML") and or Artificial Intelligence ("AI") testing process. For example, FIG. 9 is a block diagram of a system 900 implementing a partial shadow period in accordance with some embodiments. As before, the system 900 includes a motivational system computer platform 950 that can access rules from a motivational rule set data store 910. The motivational system computer platform 950 may respond to the user inputs (based on current and shadow rule sets), provide feedback to a user, and store the feedback for later analysis by an analytics platform 954 (e.g., to determine if the new rule set is operating as intended via ML, AI, or manual review by a designer).

According to some embodiments, the motivational rule set data store 910 contains both a current and a shadow motivational rule set. The platform stores results in a current motivational feedback data store 960 and a shadow motivational feedback data store 970 as appropriate. As used herein, the shadow rule set may be executed but the results of that execution are not transmitted to remote user devices 920 in a current or live group but are provided to remote user devices 930 in a shadow group. In this way, the analytics platform 954 can measure the impact of a rule set change without altering the experience for some users (although the experience of other users will be altered).

The deviation of the shadow period previously described may be considered a "partial shadow period." Note that a partial shadow period might not be appropriate in every scenario but could allow for more precise adaptations and give immediate feedback of a new system to be installed. By actively running both the old and the new systems in parallel (i.e., some users work on the old rule set and some on the new one rule set) may allow for direct evaluation and comparison of user behavior and possible adaptations to the proposed changes.

Splitting up users in this way might only be used for certain scenarios. Although such an approach might be appropriate for single user application (e.g., who participate as a "lone wolf" type of player) in a relatively anonymous environment or a platform/application such as stackoverflow.com where millions of users form a community and single individuals try to assist and spread knowledge. In other cases, however, splitting up users might have certain drawbacks. For example, such an approach might not be appropriate in competitive environments (e.g., associated with gamification concepts) because such systems encourage users to compare scores with other users. Having different rule sets in the underlying system would distort this measure (e.g., if one group receives twice as many points for an action as compared to another group and would therefore progress through the game much faster). It may also be difficult to split users in this way when they directly interact with one another (e.g., in an employee motivational program where one of the groups might be at a disadvantage). In this case, one group might need to be prevented from disclosing any information to other groups (which might not even be feasible and could, moreover, influence actual user behavior and distort results).

Figure 10:
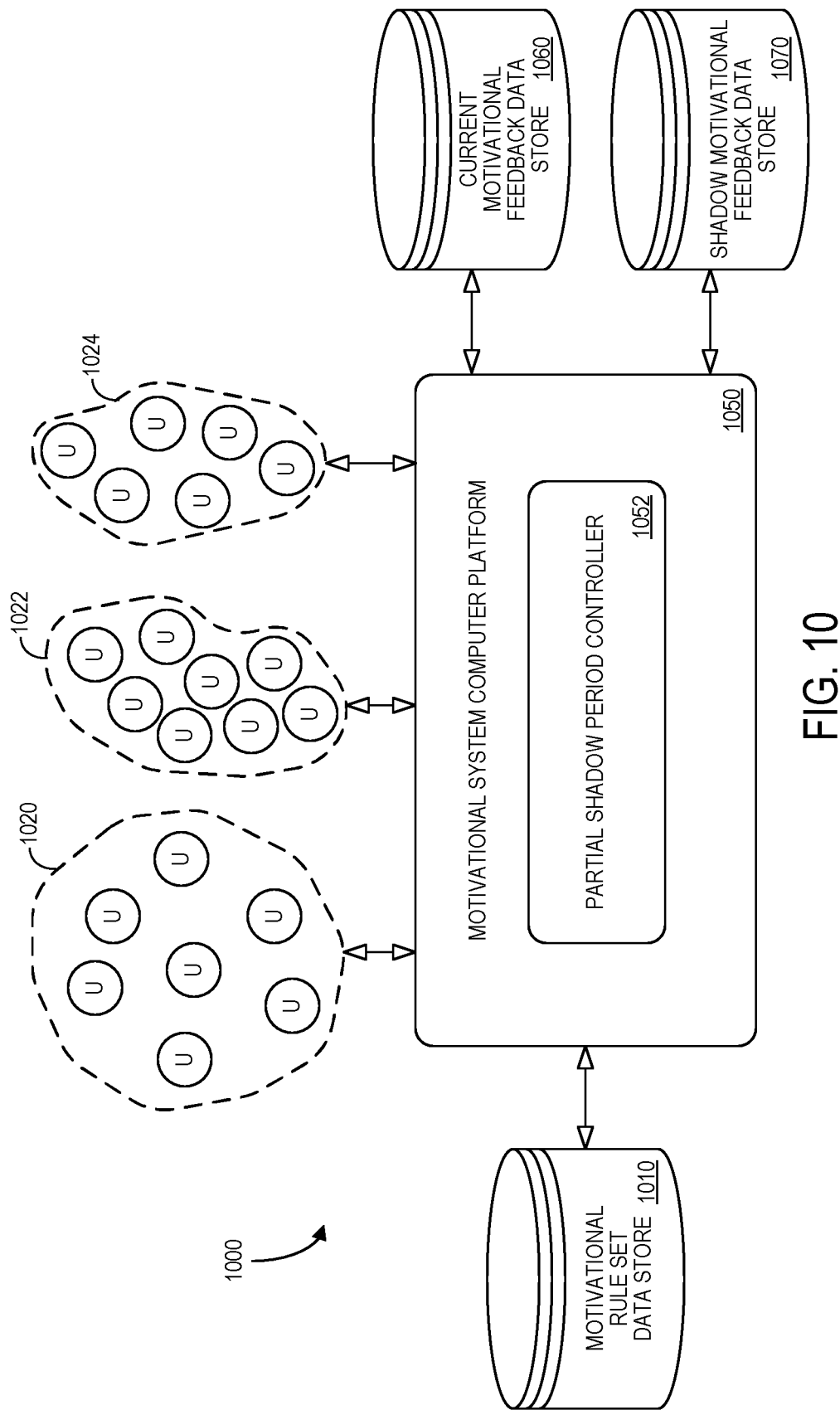
FIG. 10 illustrates a partial shadow period according to some embodiments.

According to some embodiments, multiple shadow motivational rule sets and associated shadow motivational feedback exist simultaneously for a single program. For example, FIG. 10 illustrates a partial shadow period 1000 according to some embodiments. As before, the system 1000 includes a motivational system computer platform 1050 that can access rules from a motivational rule set data store 1010. The motivational system computer platform 1050 may respond to the user ("U") inputs based on current and multiple shadow rule sets, provide feedback to users, and store the feedback for later analysis by an analytics platform (e.g., to determine if the various rule set is operating as intended).

Figure 11:
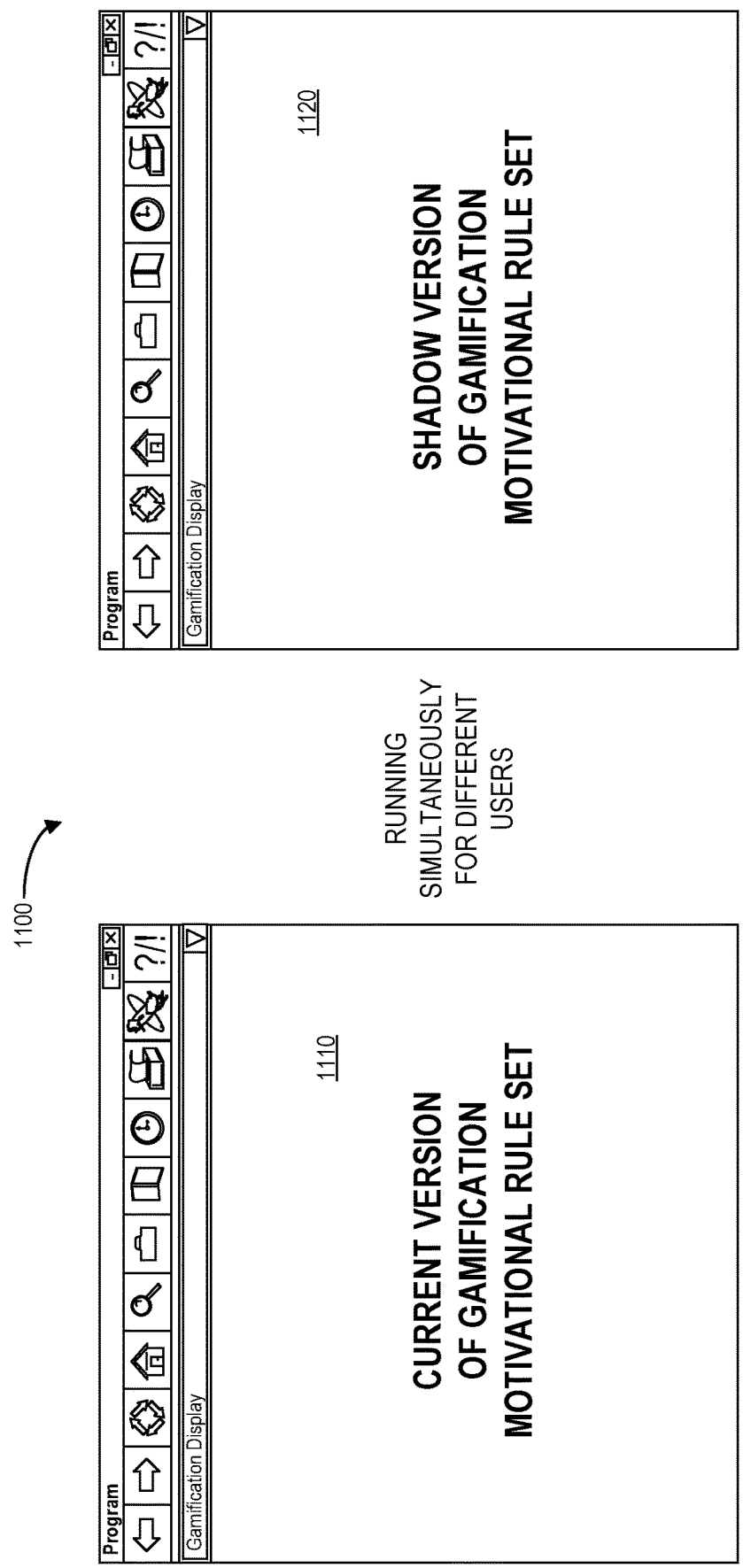
FIG. 11 includes displays that show a shadow version existing at the same time as the current version in accordance with some embodiments.

According to some embodiments, the motivational rule set data store 1010 contains: a current rule set and multiple shadow rule sets. The platform stores results in a current motivational feedback data store 1060 and a shadow motivational feedback data store 1070 (which contains feedback associated with multiple shadow rule sets) as appropriate. As used herein, the shadow rule sets may be executed but the results of that execution are not transmitted to some remote user devices 1020 in a current or live group but might (or might not) be provided to remote user devices 1022, 1024 in various shadow groups. In this way, a partial shadow period controller 1052 may simultaneously test various shadow versions (e.g., a shadow version containing changes A and B, a shadow version containing changes A and C, a shadow version containing changes B and C, etc.). FIG. 11 includes displays 1100 that show a shadow version existing at the same time as the current version in accordance with some embodiments. In particular, a current version 1110 is seen by some users while other users will simultaneous see a shadow version 1120.

Figure 12:
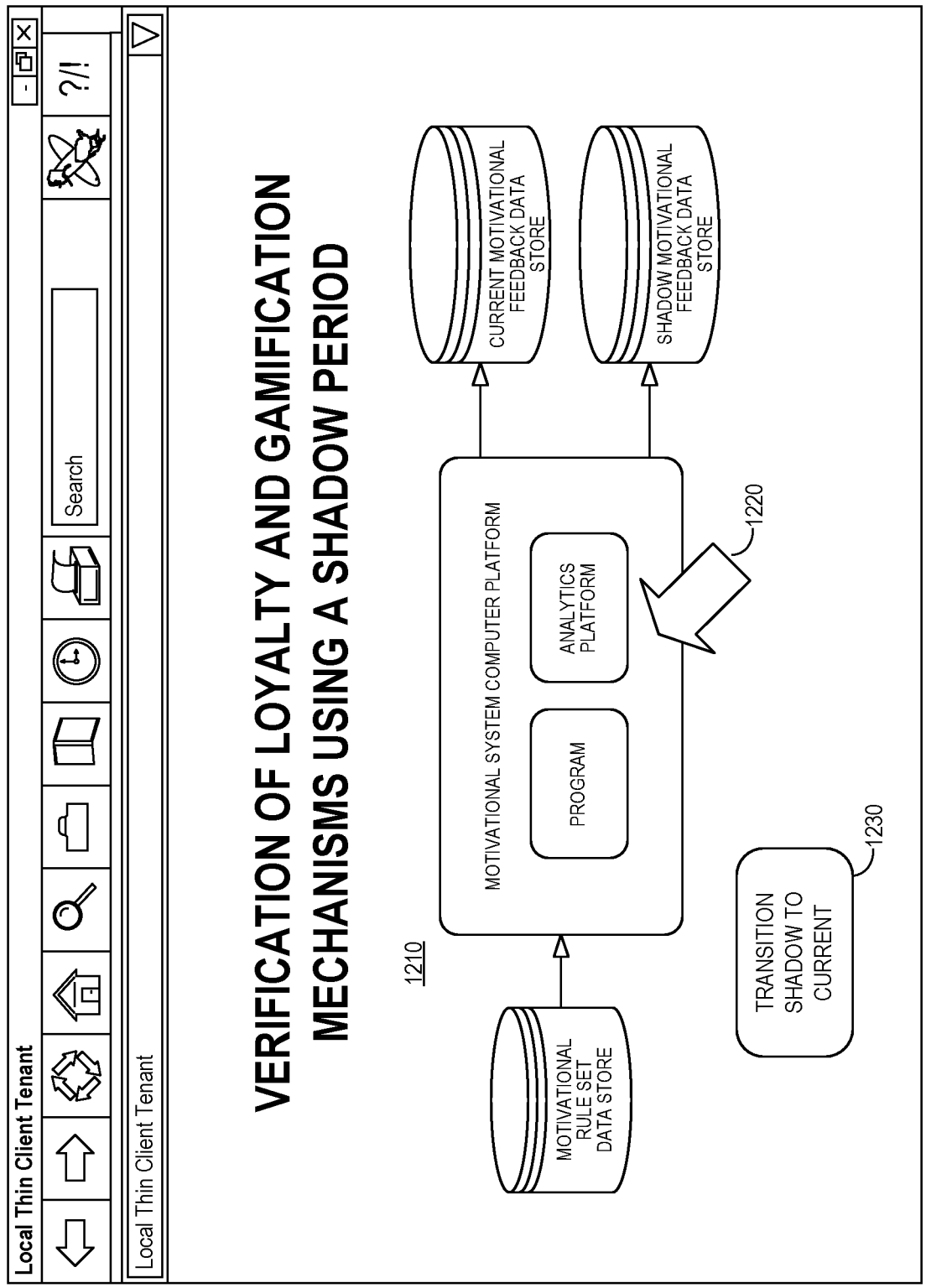
FIG. 12 is a verification of loyalty and gamification mechanisms display according to some embodiments.

Note that an operator may arrange to monitor or adjust the operation of various rule sets, shadow version, platform analytics, etc. For example, FIG. 12 is a verification of loyalty and gamification mechanisms using a shadow period display 1200 according to some embodiments. The display 1200 may provide a graphical depiction 1210 of a system (e.g., including a motivational system computer platform, various data stores, etc.) to an operator and/or to provide an interactive interface allowing an operator to adjust system components as appropriate. Selection of an element on the display 1200 (e.g., via a touchscreen or computer mouse pointer 1220) may let the operator see more information about that particular element (e.g., in a pop-up window) and/or adjust operation of that element (e.g., by introducing a new shadow period to the system). According to some embodiments, selection of a "Transition Shadow to Current" icon 1230 by an operator may initiate the introduction of a shadow rule set as the "new way to play" a gamified business application.

Figure 13:
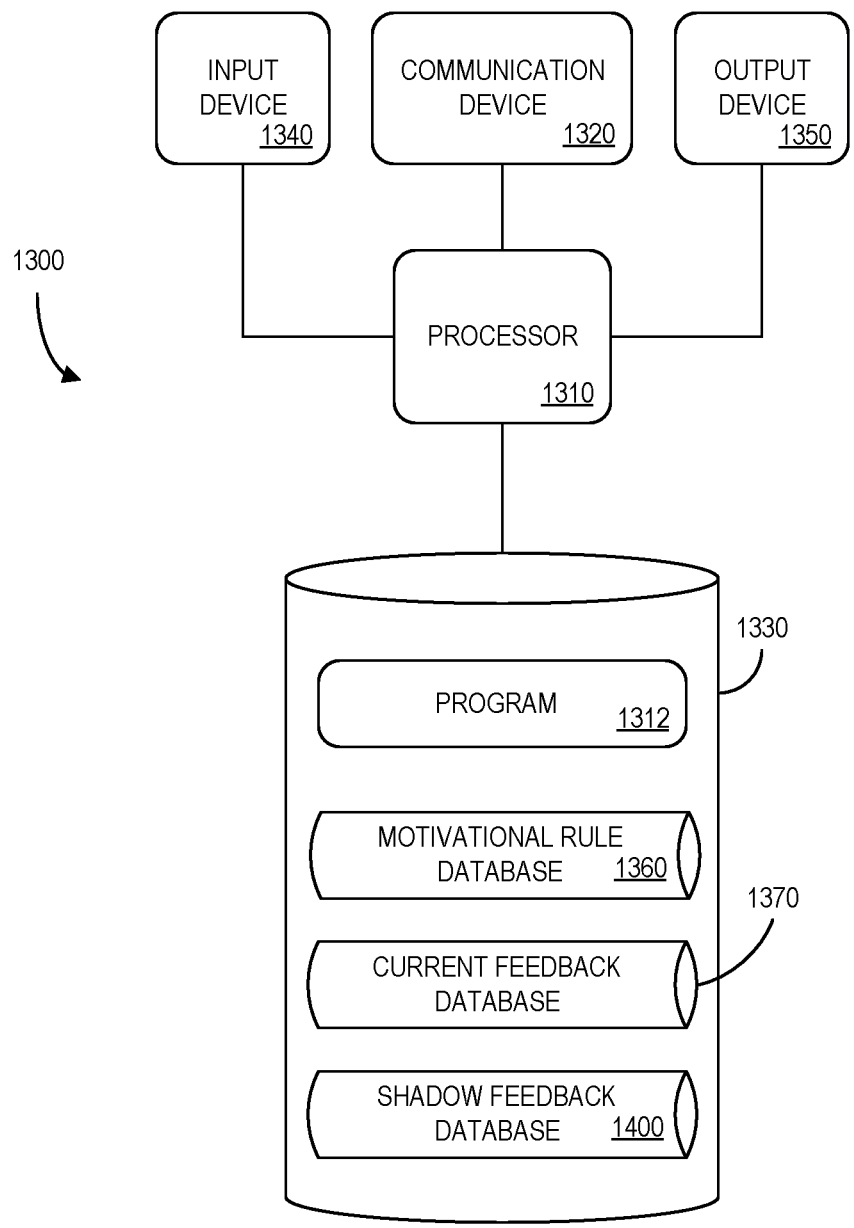
FIG. 13 is a high-level diagram of an apparatus or platform in accordance with some embodiments.

The embodiments described herein may be implemented using any of a number of different computer hardware implementations. FIG. 13 is a block diagram of apparatus 1300 according to some embodiments (e.g., the systems 100, 300 of FIGS. 1 and 3, respectively). The apparatus 1300 may comprise a general-purpose computing apparatus and may execute program code to perform any of the functions described herein. The apparatus 1300 may include other unshown elements according to some embodiments. According to some embodiments, the apparatus 1300 includes a processor 1310 operatively coupled to a communication device 1320, a data storage device 1330, one or more input devices 1340, one or more output devices 1350, and/or a memory 1360. The communication device 1320 may facilitate communication with external devices, such as a remote user device. The input device(s) 1340 may comprise, for example, a keyboard, a keypad, a mouse or other pointing device, a microphone, knob or a switch, an Infra-Red ("IR") port, a docking station, and/or a touch screen. The input device(s) 1340 may be used, for example, to enter information into the apparatus 1300 (e.g., about shadow rule sets, user groups, gaming thresholds, etc.). The output device(s) 1350 may comprise, for example, a display (e.g., a display screen) a speaker, and/or a printer (e.g., to provide configuration settings to an operator, summary analytic reports, troubleshooting information, etc.).

The data storage device 1330 may comprise any appropriate persistent storage device, including combinations of magnetic storage devices (e.g., magnetic tape, hard disk drives and flash memory), optical storage devices, Read Only Memory ("ROM") devices, etc., while the memory 1360 may comprise Random Access Memory ("RAM").

The program code 1312 may be executed by the processor 1310 to cause the apparatus 1300 to perform any one or more of the processes described herein. Embodiments are not limited to execution of these processes by a single apparatus. The data storage device 1330 may also store data and other program code for providing additional functionality and/or which are necessary for operation thereof, such as device drivers, Operating System ("OS") files, etc. For example, the processor 1310 may retrieve a current motivational rule set (e.g., a program's motivational mechanism) from a motivational rule set data store. The processor 1310 may then arrange to execute the program such that inputs from a remote user device are applied to the current motivational rule set resulting in current motivational feedback that is stored into a current motivational feedback data store and transmitted to the user device. The processor 1310 may also retrieve a shadow motivational rule set from the motivational rule set data store. The processor 1310 may then arrange to execute the program such that inputs from the user device are also applied to the shadow motivational rule set, in parallel with the current motivational rule set, resulting in shadow motivational feedback that is stored into a shadow motivational feedback data store without being transmitted to the user device.

In some embodiments (such as shown in FIG. 13), the storage device 1330 further stores a motivation rule database 1360 (e.g., containing information about motivation mechanisms), a current feedback database 1370 (to store a "baseline" against which rule changes may be measured), and a shadow feedback database 1400. An example of a database that may be used in connection with the apparatus 1300 will now be described in detail with respect to FIG. 14. Note that the database described herein is only one example, and additional and/or different information may be stored therein. Moreover, various databases might be split or combined in accordance with any of the embodiments described herein.

Referring to FIG. 14, a table is shown that represents the shadow feedback database 1400 that may be stored at the apparatus 1300 according to some embodiments. The table may include, for example, entries identifying various shadow rule sets currently deployed in a system. The table may also define fields 1402, 1404, 1406, 1408, 1410 for each of the entries. The fields 1402, 1404, 1406, 1408, 1410 may, according to some embodiments, specify: a shadow rule set identifier 1402, an associated current rule set identifier 1404, a description 1406, a date and time 1408, and a status 1410. The shadow feedback database 1400 may be created and updated, for example, based on information received via an operator, as user inputs are processed, as feedback is analyzed, etc.

The shadow rule set identifier 1402 may be, for example, a unique alphanumeric code identifying a shadow motivational rule set (e.g., containing changes that an operator hopes will lead to improved employee actions). The associated current rule set identifier 1404 might indicate the base line version of the game against which changes can be compared. The description might describe the type of shadow period (e.g. a total shadow period, a partial shadow period, etc.). The date and time 1408 might indicate when the shadow rule set was first introduced into the system (e.g., may be used to transition a shadow rule set after 30 days of monitoring). The status 1410 might indicate that the shadow rule set is "hidden" from users, is partially transitioned into the active or current rule set, etc.

Thus, embodiments may provide several advantages, such as by providing systems and methods to facilitate an automated verification of a motivation mechanism in an accurate and efficient manner. This may improve the overall efficiency of an enterprise (by encouraging beneficial employee behaviors).

Figure 15:
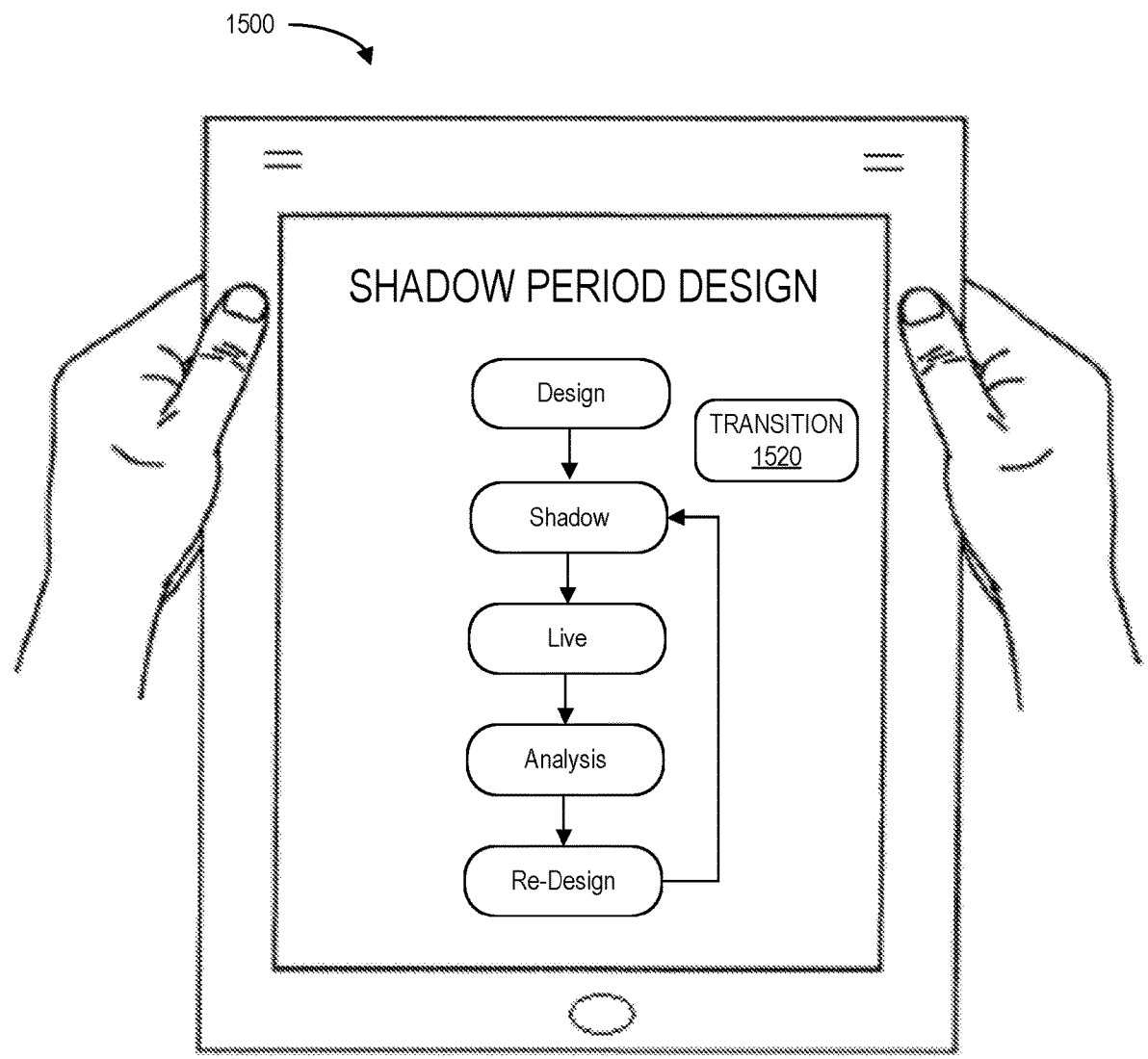
FIG. 15 illustrates a handheld tablet computer in accordance with some embodiments.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein. Moreover, the displays described are provided only as examples and other types of displays might be implemented. For example, FIG. 15 shows a handheld tablet computer 1500 in accordance with some embodiments. A display 1510 might provide information about an overall design process that includes shadow rule sets and period and one or more icons 1520 may be selected by the user to adjust operation of the system (e.g., by initiating a transition, adding a new shadow group, etc.).

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system associated with a motivational mechanism, comprising:
   (a) a user device;
   (b) a motivational rule set data store containing a current motivational rule set and a shadow motivational rule set;
   (c) a current motivational feedback data store;
   (d) a shadow motivational feedback data store;
   (e) a motivational system platform, remote from the user device and coupled to the user device and the motivational rule set data store via a distributed communication network, including:
      a computer processor, and
      a computer memory coupled to the computer processor and storing instructions adapted to, when executed by the computer processor, cause the motivational system platform to:
         (i) retrieve the current motivational rule set,
         (ii) arrange to execute a program such that inputs from the user device are applied to the current motivational rule set resulting in current motivational feedback that is stored into the current motivational feedback data store and transmitted to the user device,
         (iii) retrieve the shadow motivational rule set, and
         (iv) arrange to execute the program such that inputs from the user device are also applied to the shadow motivational rule set, in parallel with the current motivational rule set, resulting in shadow motivational feedback that is stored into the shadow motivational feedback data store without being transmitted to the user device; and
   (f) an analytics platform to compare the current motivational feedback with the shadow motivational feedback, wherein results of said comparison are used along with machine learning to automatically generate or modify a motivational rule set,
   and further wherein the motivational system platform is to automatically transition the shadow motivational rule set into the current motivational rule set responsive to a determination that a pre-determined threshold has been reached in connection with at least one of the current motivational rule set the shadow current motivational rule set.

2. The system of claim 1, wherein the motivational mechanism is associated with at least one of: (i) a gamification application, and (ii) a loyalty program.

3. The system of claim 1, wherein said transition is performed for one set of users and not performed for another set of users.

4. The system of claim 1, wherein multiple shadow motivational rule sets and associated shadow motivational feedback exist simultaneously for a single program.

5. A computer-implemented method associated with a motivational mechanism, comprising:
   retrieving, by a computer processor of a motivational system platform from a motivational rule set data store, a current motivational rule set;
   arranging to execute a program such that inputs from a remote user device are applied to the current motivational rule set resulting in current motivational feedback that is stored into a current motivational feedback data store and transmitted to the user device;
   retrieving, by the motivational system platform from the motivational rule set data store, a shadow motivational rule set;
   arranging to execute the program such that inputs from the user device are also applied to the shadow motivational rule set, in parallel with the current motivational rule set, resulting in shadow motivational feedback that is stored into a shadow motivational feedback data store without being transmitted to the user device;
   comparing, by an analytics platform, the current motivational feedback with the shadow motivational feedback, wherein results of said comparison are used along with machine learning to automatically generate or modify a motivational rule set; and
   automatically transitioning, by the motivational system platform, the shadow motivational rule set into the current motivational rule set responsive to a determination that a pre-determined threshold has been reached in connection with at least one of the current motivational rule set the shadow current motivational rule set.

6. The method of claim 5, wherein the motivational mechanism is associated with at least one of: (i) a gamification application, and (ii) a loyalty program.

7. The method of claim 5, wherein said transition is performed for one set of users and not performed for another set of users.

8. A non-transitory, computer-readable medium storing program code, the program code executable by a computer processor to cause the processor to perform a method associated with a motivational mechanism, the method comprising:
   retrieving, by a computer processor of a motivational system platform from a motivational rule set data store, a current motivational rule set;
   arranging to execute a program such that inputs from a remote user device are applied to the current motivational rule set resulting in current motivational feedback that is stored into a current motivational feedback data store and transmitted to the user device;
   retrieving, by the motivational system platform from the motivational rule set data store, a shadow motivational rule set;
   arranging to execute the program such that inputs from the user device are also applied to the shadow motivational rule set, in parallel with the current motivational rule set, resulting in shadow motivational feedback that is stored into a shadow motivational feedback data store without being transmitted to the user device;
   comparing, by an analytics platform, the current motivational feedback with the shadow motivational feedback, wherein results of said comparison are used along with machine learning to automatically generate or modify a motivational rule set; and
   automatically transitioning, by the motivational system platform, the shadow motivational rule set into the current motivational rule set responsive to a determination that a pre-determined threshold has been reached in connection with at least one of the current motivational rule set the shadow current motivational rule set.

9. The medium of claim 8, wherein the motivational mechanism is associated with at least one of: (i) a gamification application, and (ii) a loyalty program.

\* \* \* \* \*